United States Patent
Moshrefi et al.

(10) Patent No.: US 6,750,897 B1
(45) Date of Patent: Jun. 15, 2004

(54) SYSTEMS AND METHODS FOR IMPLEMENTING INTERNET VIDEO CONFERENCING USING STANDARD PHONE CALLS

(75) Inventors: Afshin Moshrefi, Newburyport, MA (US); Reza Ghaffari, Chestnut Hill, MA (US)

(73) Assignee: Verizon Data Services Inc., Temple Terrace, FL (US)

( * ) Notice: Subject to any disclaimer, the term of this patent is extended or adjusted under 35 U.S.C. 154(b) by 0 days.

(21) Appl. No.: 10/083,607

(22) Filed: Feb. 26, 2002

Related U.S. Application Data

(60) Provisional application No. 60/312,910, filed on Aug. 16, 2001.

(51) Int. Cl.[7] ................................................ H04N 7/14
(52) U.S. Cl. ............................. 348/14.08; 348/14.12; 370/261
(58) Field of Search .......................... 348/14.01–14.09, 348/14.1, 14.11, 14.12, 14.13; 379/93.07, 202.01; 370/260, 261, 352; 709/204

(56) References Cited

U.S. PATENT DOCUMENTS

2002/0083462 A1 * 6/2002 Arnott ..................... 348/14.08

FOREIGN PATENT DOCUMENTS

| EP | 0818908 A2 | * | 1/1998 | ........... H04L/29/06 |
| JP | 2000-270307 | * | 9/2000 | ............ H04N/7/15 |

OTHER PUBLICATIONS

Kranzler; Alarm . . . and instant messaging; WO01/11586A1.*

* cited by examiner

*Primary Examiner*—Melur Ramakrishnaiah
(74) *Attorney, Agent, or Firm*—Leonard C. Suchyta, Esq.; Joel Wall, Esq.

(57) ABSTRACT

A video conferencing system (100) includes a switch (125), a server (140), a telephone device (152), and a node (102) in a packet-switched network (135). The switch (125) establishes a circuit-switched connection between a calling party number and a called party number. The server (140) associates first and second network addresses in a packet-switched network (135) with each of the called party and calling party numbers. The telephone device (152) transmits audio data via the circuit-switched connection. The node (102) in the packet-switched network (135) transmits packetized video between the first and second network addresses responsive to establishment of the circuit-switched connection.

16 Claims, 7 Drawing Sheets

TELEPHONE / NETWORK ADDRESS TABLE 405

| CALLER ID 415 | NETWORK ADDRESS 420 |
|---|---|
| 111-222-3333 | 128.96.33.81 |
| 111-222-4444 | 95.42.88.82 |
| 111-222-5555 | 128.23.94.12 |

TABLE ENTRIES 410

SYSTEMS AND METHODS FOR IMPLEMENTING INTERNET VIDEO CONFERENCING USING STANDARD PHONE CALLS

CROSS REFERENCE TO RELATED APPLICATIONS

The instant application claims priority from provisional application No. 60/312,910, filed Aug. 16, 2001, which is incorporated by reference herein in its entirety.

FIELD OF THE INVENTION

The present invention relates generally to systems and methods for video conferencing and, more particularly, to systems and methods that implement packet-switched video conferencing initiated by circuit-switched telephone calls.

BACKGROUND OF THE INVENTION

For years videophones have been viewed as a futuristic technological endeavor. Even with the advent of high-speed Internet access, the promise of reliable, high quality videophones has not been realized. Conventional video conferencing has a number of disadvantages. Traditional video conferencing requires specialized, costly equipment for each participant in the conference. Significant bandwidth, additionally, must be dedicated to the video conferencing session, thus, requiring at least IDSN or better service. Also, the specialized equipment used is costly and, thus, prohibitive for use by the general public, and generally involves large video conferencing units that must be located in specially designated areas.

Internet video conferencing has alleviated some of the problems attendant with traditional video conferencing, including the use of desktop computers equipped with video cameras and audio microphones instead of large, expensive, and specialized video conferencing equipment. The quality of video and audio in conventional Internet video conferencing, however, has been found to be relatively poor. Additionally, other problems exist in Internet video conferencing, including difficulties in reaching others involved in the conferencing, requiring knowledge of the other party's IP address or the location of a directory service on which the other party is listed.

Therefore, there exists a need for systems and methods that permit the implementation of Internet video conferencing with high video and audio quality, and without requiring knowledge, by conference participants, of the other party's IP addresses, or the location of the directory services on which the other parties are listed.

SUMMARY OF THE INVENTION

Systems and methods consistent with the present invention address this and other needs by enabling video conferencing using a circuit-switched telephone connection for audio, and a high-speed DSL connection for transmitting packetized video between parties to the conference. At the time a call is placed between a calling party number and a called party number in a circuit-switched network, a server references each of the party numbers to network addresses in a packet-switched network. The server sends these network addresses to respective nodes in the packet-switched network associated with each of the called and calling parties. The respective nodes may use the received network addresses to transfer packetized video, captured contemporaneously with audio transmitted via a circuit-switched network, between each of the parties to the circuit-switched telephone connection. With the packetized video transmitted at a DSL rate, and the audio data transmitted at conventional circuit-switched rates, high quality video conferencing may be obtained. Furthermore, in other embodiments of the invention, the respective nodes may use the received network addresses to transfer both packetized audio and video between each of the parties to the circuit-switched telephone connection.

In accordance with the purpose of the invention as embodied and broadly described herein, a method of video conferencing includes establishing a circuit-switched connection between a first party and a second party; and establishing, responsive to the establishment of the circuit-switched connection, a packet-switched connection between the first party and the second party to transmit video.

In another implementation consistent with the present invention, a method of setting up a video conference includes receiving a calling party number and a called party number used for establishing a connection in a circuit-switched network; associating a first network address in a packet-switched network with the calling party number; associating a second network address in the packet-switched network with the called party number; sending a first message containing the second network address to the first network address via the packet-switched network; and sending a second message containing the first network address to the second network address via the packet-switched network.

In yet another implementation consistent with the present invention, a method of video conferencing includes establishing a circuit-switched connection between a calling party number and a called party number; associating first and second network addresses in a packet-switched network with each of the called party and calling party numbers; transmitting audio data via the circuit-switched connection; and transmitting packetized video between the first and second network addresses responsive to establishment of the circuit-switched connection.

In a further implementation consistent with the present invention, a method of video conferencing includes capturing audio contemporaneously with video at a first location; capturing audio contemporaneously with video at a second location; transmitting the captured audio between the first location and the second location via a circuit-switched network; and transmitting the captured video between the first and second location via a packet-switched network.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, provide mechanisms that enable high quality video conferencing through the transmission of audio via a circuit-switched network (or possibly a packet-switched network), and through the transmission of packetized video, captured contemporaneously with the audio, via a high-speed DSL connection and the packet-switched network.

Examplary Network

Figure 1:
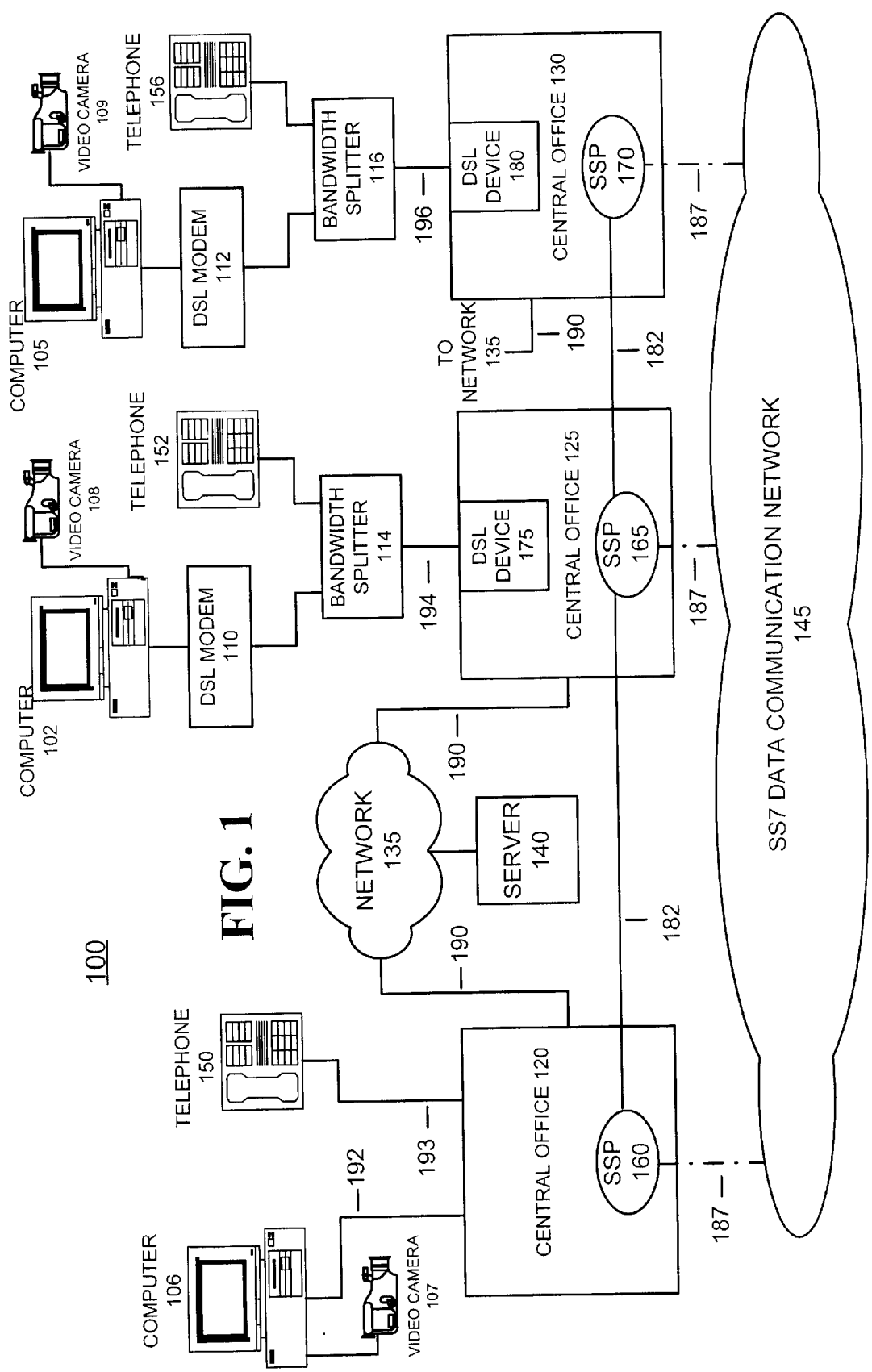
FIG. 1 illustrates an exemplary network in which systems and methods, consistent with the present invention, may be implemented.

FIG. 1 illustrates an exemplary network 100 in which systems and methods, consistent with the present invention, implement packet-switched video conferencing initiated by a standard circuit-switched telephone call. Network 100 may include computers 102, 105 and 106; video cameras 107, 108, 109; digital subscriber line (DSL) modems 110 and 112; bandwidth splitters 114 and 116; central offices 120, 125 and 130; network 135; server 140; a Signaling System Number 7 (SS7) data communication network 145; and telephones 150, 152 and 156. Telephones 150, 152 and 156 can include any type of conventional telephony devices known within the art. Central offices 120, 125 and 130 may include conventional service switching points (SSPs) 160, 165 and 170, respectively, for establishing circuit-switched connections. Central offices 125 and 130 may further include conventional DSL devices 175 and 180, respectively.

Computer 102 may connect to DSL device 175 of central office 125 via DSL modem 110 and bandwidth splitter 114. DSL modem 110 can receive data from computer 102 and transmit the received data to bandwidth splitter 114 over a data frequency band. DSL modem 110 can further receive voice data from telephone 152 and transmit the received data to bandwidth splitter 114 over a voice frequency band. Bandwidth splitter 114 can combine data received over data and voice frequency bands for transmission to DSL device 175 via telephone line 194. Bandwidth splitter 114 can further separate voice band frequencies and data band frequencies received from DSL device 175 via telephone line 194.

Computer 105 may connect to DSL device 180 of central office 130 via DSL modem 112 and bandwidth splitter 116. DSL modem 112 can receive data from computer 105 and transmit the received data to bandwidth splitter 116 over a data frequency band. DSL modem 112 can further receive voice data from telephone 156 and transmit the received data to bandwidth splitter 116 over a voice frequency band. Bandwidth splitter 116 can combine data received over data and voice frequency bands for transmission to DSL device 180 via telephone line 196. Bandwidth splitter 116 can further separate voice band frequencies and data band frequencies received from DSL device 180 via telephone line 196.

Computer 106 and telephone 150 may connect to central office 120 via separate telephone lines 192 and 193, respectively.

Computers 102, 105 and 106 may connect to network 135 via links 190 and central offices 120, 125 and 130, respectively. Network 135 may include one or more connection-less or connection-oriented packet-switched networks, including local area networks (LANs), metropolitan area networks (MANs), wide area networks (WANs), an intranet, or the Internet. Such networks may employ any conventional packet-switched protocol including, but not limited to, Internet Protocol (IP) or Asynchronous Transfer Mode (ATM). Computers 102, 105 and 106 may each be collocated with respective telephones 152, 156 and 150 such that a user may converse via a telephone and view video on a video monitor of a computer.

Server 140 can include a network node that receives and processes data packets from network 135. Server 140 can connect to network 135 via wired, wireless or optical connection links. Server 140 may initiate the establishment of packetized video (and possibly packetized audio) transfer between two computers (e.g., computer 106 and computer 102, or computer 102 and computer 105) using a database that associates network addresses in network 135 of the computers, with telephone numbers of telephones (e.g., telephones 150, 152 and 156) that are collocated with each computer.

SS7 network 145 can include a conventional network that uses SS7 signaling protocols for setting up telephone calls between SSPs 160, 165 and 170. Network 145 can include conventional service control points (SCPs) and signal transfer points (STP) for routing calls between SSPs.

SSPs 160, 165 and 170 may include conventional network nodes having SS7 messaging capability. SSPs 160, 165 and 170 connect with one another via links 182. Links 182 include circuits for connecting calls between telephones 150, 152 and 156. SSPs 160, 165 and 170 may be connected to SS7 network 145 via links 187.

Exemplary Computer

Figure 2:
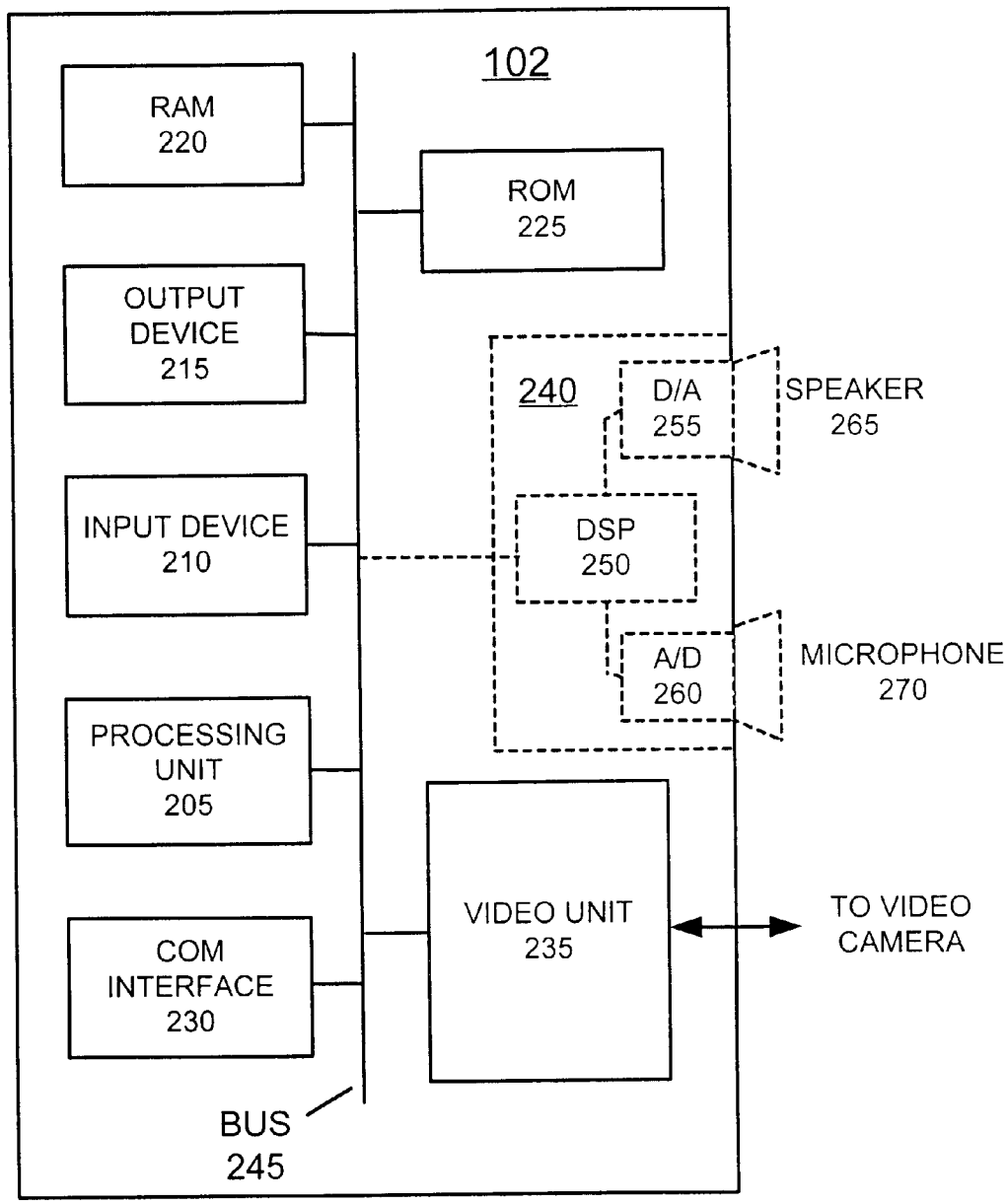
FIG. 2 illustrates exemplary components of a computer consistent with the present invention.

FIG. 2 illustrates an exemplary computer 102 in which systems and methods, consistent with the present invention, may be implemented for setting up packet-switched video conferencing between a calling party and a called party at, for example, telephones 152 and 156. Computer 102 may include a processing unit 205, an input device 210, an output device 215, a Random Access Memory (RAM) 220, a Read Only Memory (ROM) 225, a communication interface 230, a video unit 235, an optional packetized telephone peripheral 240, and a bus 245.

Processing unit 205 may perform all data processing functions for inputting, outputting, and processing of data. Input device 210 permits entry of data into computer 102 and includes one or more user interfaces (not shown), such as a keyboard, a mouse or the like. Output device 215 permits the output of data in video, audio, or hard copy format.

RAM 220 provides semi-permanent working storage of data and instructions for use by processing unit 205. ROM 225 provides permanent or semi-permanent storage of data and instructions for use by processing unit 205. RAM 220 and ROM 225 may include large-capacity storage devices, such as a magnetic and/or optical recording medium and its corresponding drive. Communication interface 230 includes conventional mechanisms for connecting computer 102 to network 135. Video unit 235 may include conventional circuitry for framing, encoding and packetizing video received from a video camera.

Packetized telephone peripheral 240 may include a digital signal processor (DSP) 250, a digital-to-analog (D/A) converter 255, an analog-to-digital (AID) converter 260, a speaker 265 and a microphone 270. DSP 250 may perform functions, such as packet buffering, voice coding, equalization, and audio data processing. D/A converter 255 includes conventional circuitry for converting digital audio signals to analog signal form for output, for example, via speaker 265. Speaker 265 includes a conventional mechanism for providing an auditory output of the D/A-converted audio signals. A/D converter 260 includes conventional circuitry for sampling and converting analog audio input signals from microphone 270 to digital signal form. Microphone 270 includes a conventional mechanism for converting auditory input into analog signals.

Bus 245 interconnects the various components of computer 102 to permit the components to communicate with one another.

Exemplary Server

Figure 3:
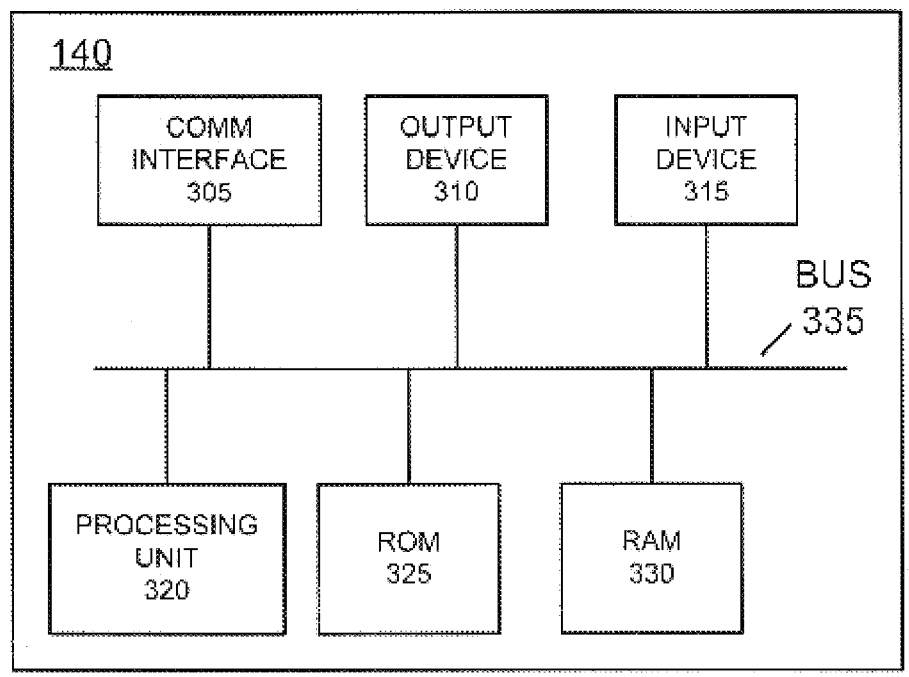
FIG. 3 illustrates exemplary components of a server consistent with the present invention.

FIG. 3 illustrates an exemplary server 140, consistent with the present invention, which is configured to process calling and called party numbers received from a central office (e.g., central offices 120, 125, 130). Server 140 includes a communication interface 305, an output device 310, an input device 315, a processing unit 320, a ROM 325, a RAM 330, and a bus 335.

Communication interface 305 includes conventional mechanisms for connecting server 140 with network 135. Output device 310 permits the output of data in video, audio, or hard copy format. Input device 315 permits entry of data into server 140 and includes a user interface (not shown). Processing unit 320 performs all data processing functions for inputting, outputting, and processing of data. ROM 325 provides permanent or semi-permanent storage of data and instructions for use by processing unit 320. RAM 330 provides semi-permanent working storage of data and instructions for use by processing unit 320. ROM 325 and RAM 330 may include large-capacity storage devices, such as a magnetic and/or optical recording medium and its corresponding drive. Bus 335 interconnects the various components of server 140 to permit the components to communicate with one another.

Exemplary Database

Figures 4A, 4B:
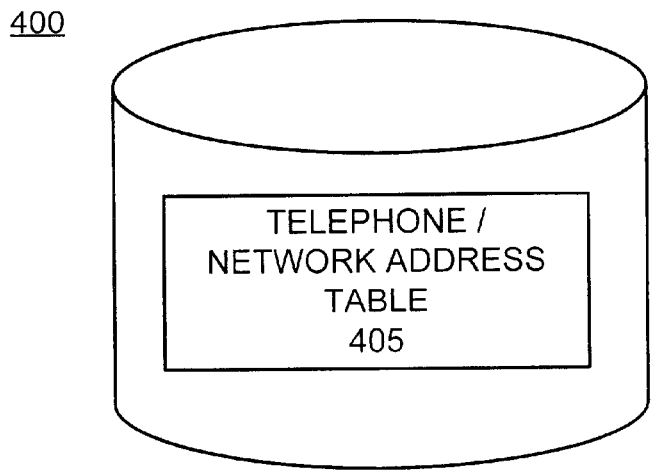
FIG. 4A illustrates an exemplary database consistent with the present invention.
FIG. 4B illustrates an exemplary table stored in the database of FIG. 4A consistent with the present invention.

FIG. 4A illustrates an exemplary database 400 that may be stored in, for example, RAM 330 of server 140 or may be located external to server 140. Database 400 may include a telephone/network address table 405 that associates network addresses (e.g., IP addresses) with caller identifiers (e.g., telephone numbers).

FIG. 4B illustrates an exemplary telephone/network address table 405. Table 405 may include multiple entries 410, with each entry associating a given caller identifier 415 with a network address 420 (e.g., an IP address) for setting up a packet-switched video connection. Table 405 may, thus, be used to retrieve a network address 420 based on a caller identifier number 415 (e.g., a telephone number).

Exemplary Video Conferencing Process

Figure 5:
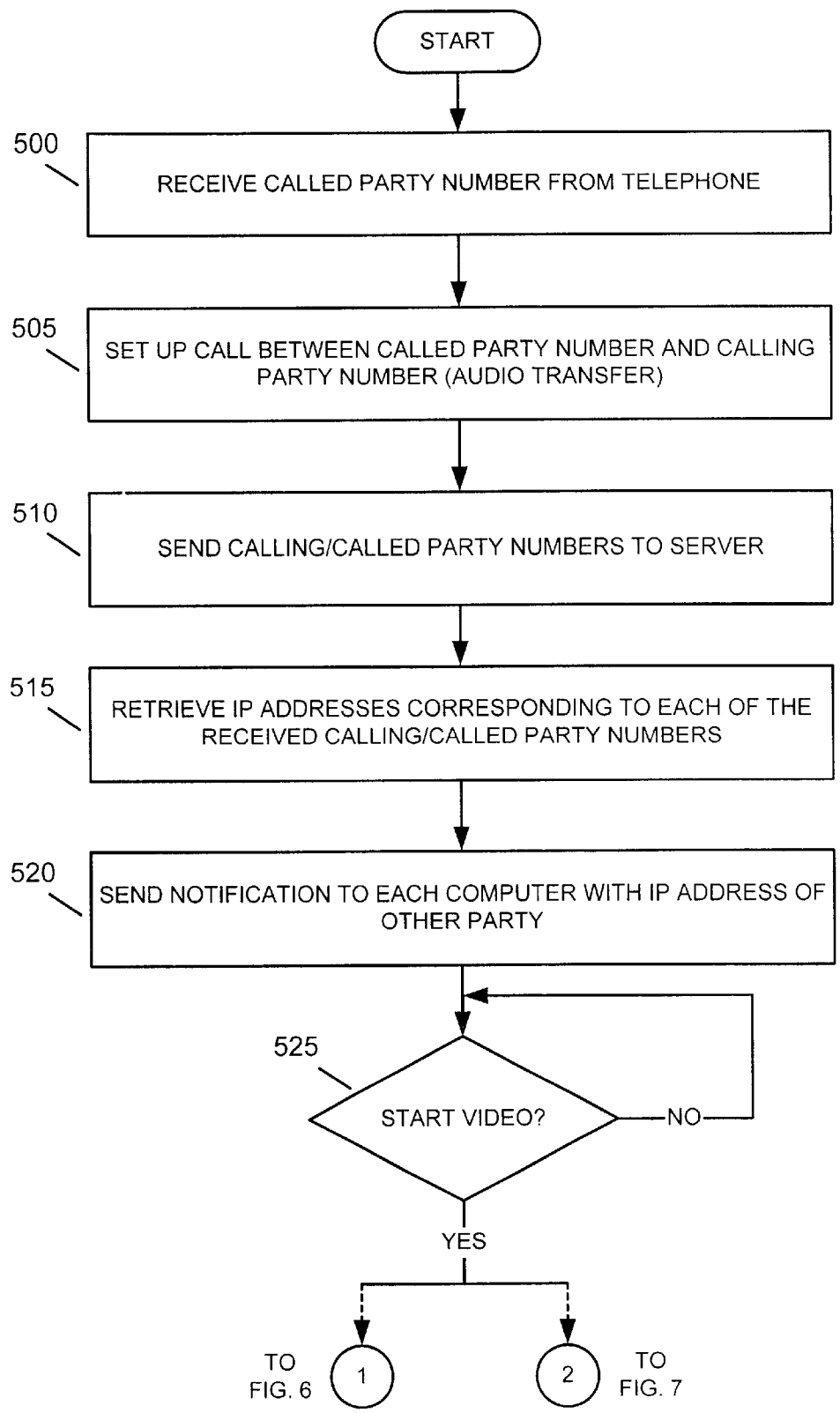
FIGS. 5–7 are flowcharts that illustrate an exemplary process for setting up an audio and video connection between two callers consistent with the present invention.
Figure 6:
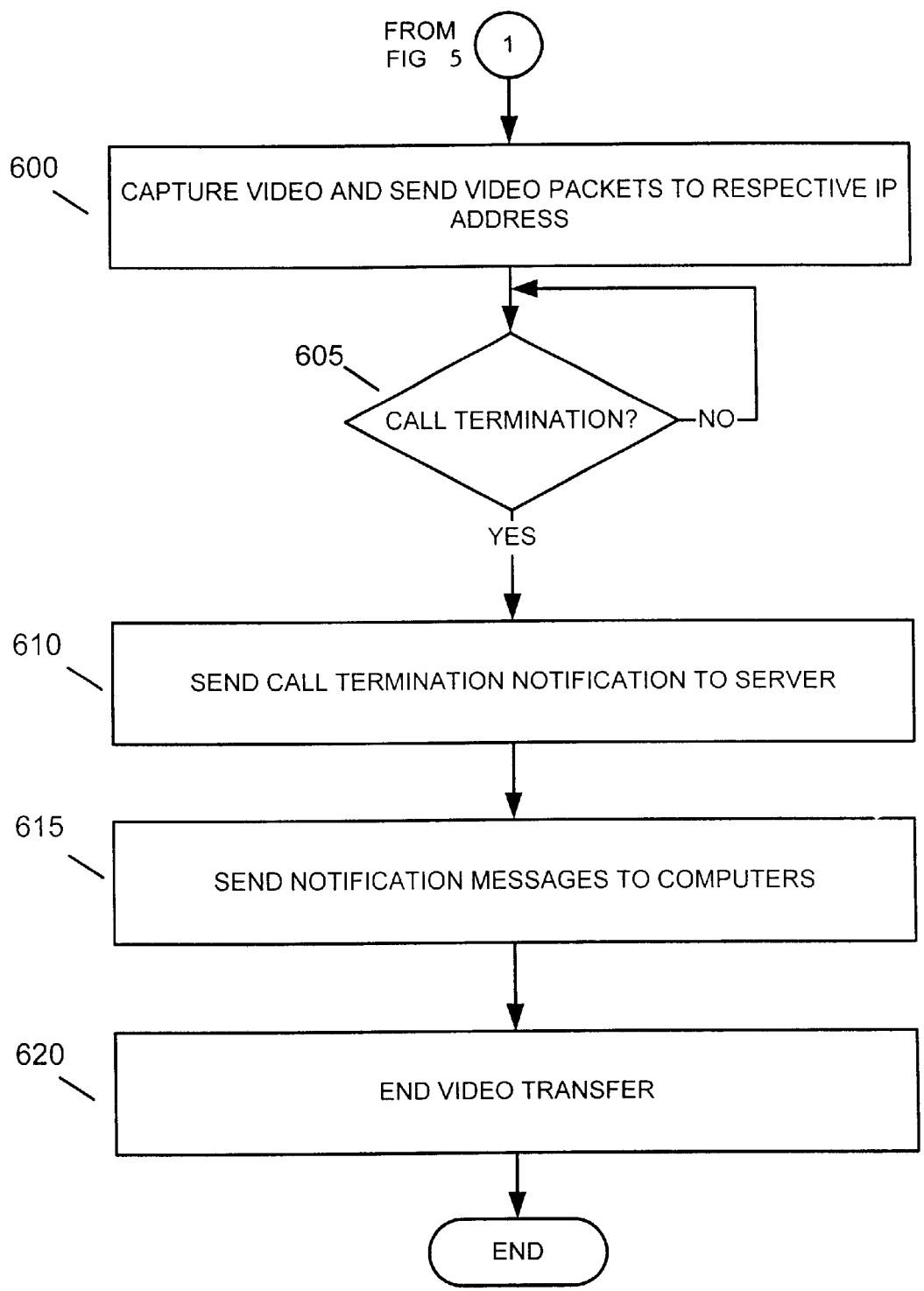
Figure 7:
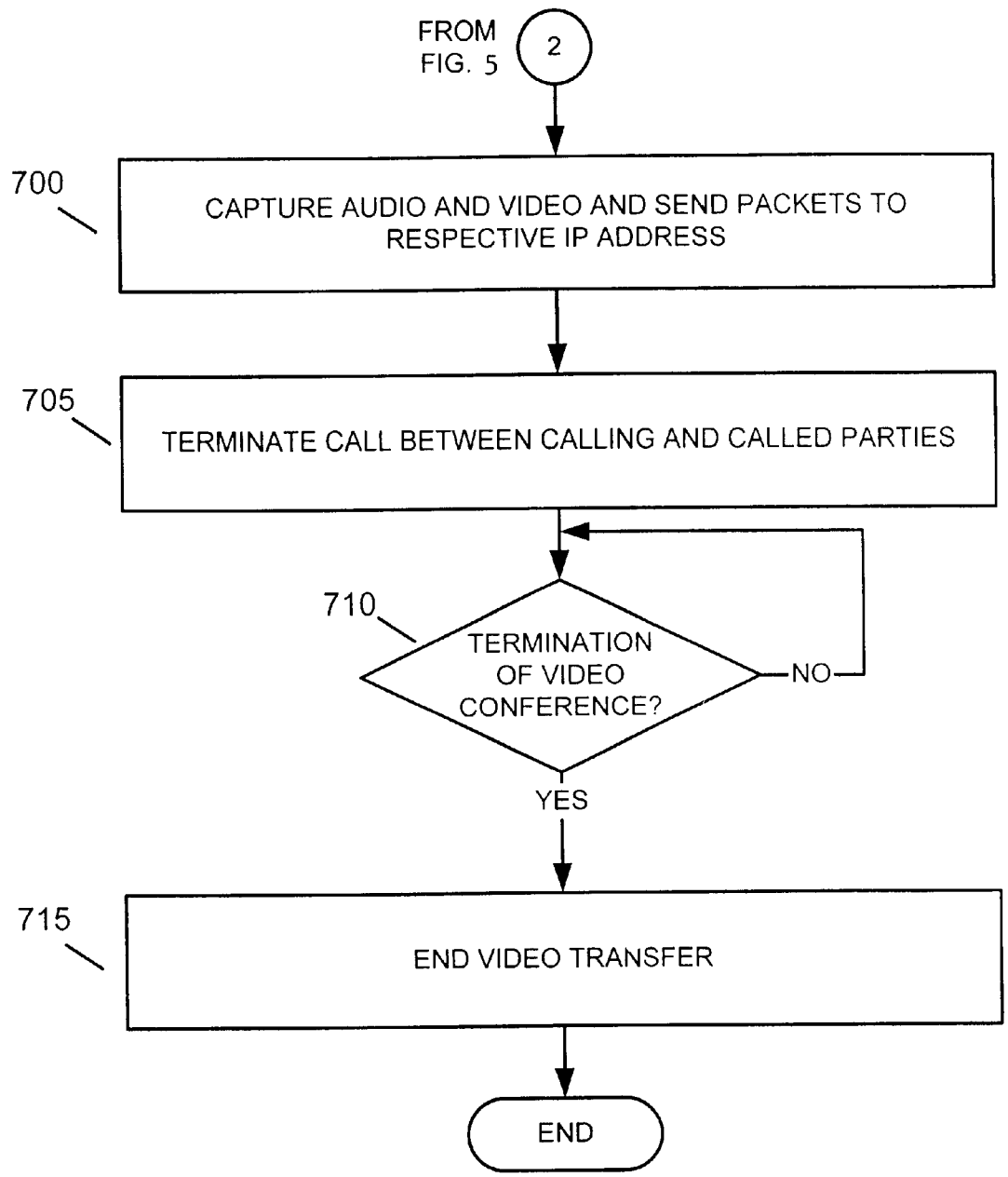

FIGS. 5–7 are flowcharts that illustrate an exemplary process, consistent with the present invention, for setting up a video conference between two callers. The videoconference may include audio transmitted via a circuit-switched network (or a packet-switched network) and video transmitted via the packet-switched network at, possibly, a DSL rate.

Figure 8:
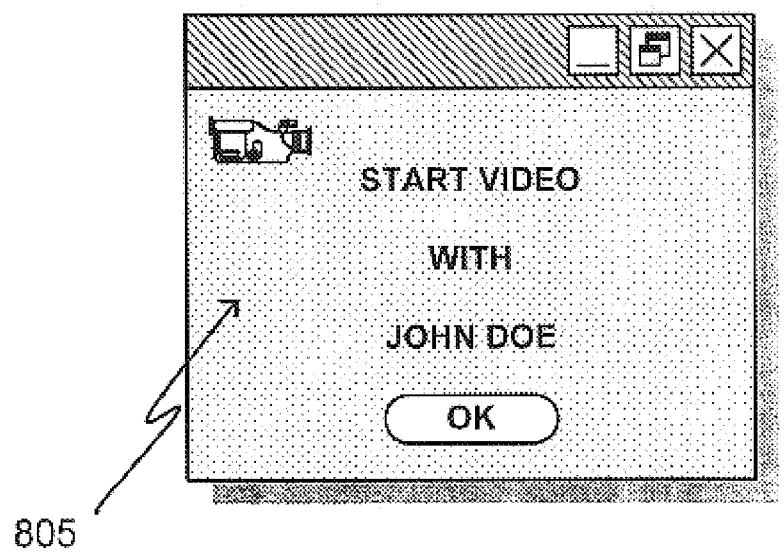
FIG. 8 illustrates an exemplary window of a graphical user interface consistent with the present invention.

To begin the exemplary process, a central office (e.g., central office 125) may receive a called party number from a telephone (e.g., telephone 152) [act 500]. The central office and SS7 network 145 may set up a circuit-switched audio connection between the called party number and the number of the calling party [act 505]. The number of the calling party may be retrieved using, for example, conventional "caller ID." The central office may further send a video set-up message containing the called and calling party numbers to server 140 via network 135 [act 510]. Server 140 may look up, in table 405 of database 400, network addresses 420 corresponding to each of the received calling/called party numbers [act 515]. The network addresses identify the computers associated with the calling and called parties. Server 140 may then send a notification message to each computer (i.e., the calling party's computer and the called party's computer) with the network address (e.g., IP address) of the other party to the call [act 520]. Server 140 may use, for example, conventional instant messaging techniques to send the notification messages to each computer. Each computer determines whether video transfer should be started [act 525]. As shown in FIG. 8, each party may "click" on an appropriate "button" in a window 805 of a computer graphical user interface, for example, to start video transfer. If video transfer is initiated, a number of different techniques may be used for transferring audio and video between the calling and called parties. In a first technique, shown in FIG. 6, audio may be sent via the circuit-switched network and video may be sent via the packet-switched network. In a second technique, shown in FIG. 7, both audio and video may be sent via the packet-switched network subsequent to call set-up over the circuit-switched network.

Turning to the technique shown in FIG. 6, each computer may capture video, via a video camera (e.g., video camera 107, 108 or 109), and send video packets to the IP address associated with the other party [act 600]. SS7 network 145 may determine if the already established circuit-switched call between the two parties has been terminated [act 605]. If so, SS7 network 145 may send a call termination notification to server 140 [act 610]. In turn, server 140 may send termination notification messages to the computers engaged in the video conferencing via network 135 [act 615]. Each computer, in response to receipt of a termination notification message, may end the video transfer [act 620].

In the technique shown in FIG. 7, each computer may capture video, via a video camera (e.g., video camera 107, 108 or 109) and audio, via a microphone 265 and a DSP 245, and send audio and video packets to the IP address associated with the other party [act 700]. After video and audio transfer is established between computers associated with each of the calling and called parties, the already established circuit-switched call between the calling party number and the called party number may be terminated [act 705]. For example, server 140 may notify SS7 network 145 that the circuit-switched connection between the calling party number and the called party number may be terminated. SS7 network 145 may then, accordingly, end the circuit-switched connection. Each computer (i.e., the calling party's computer and the called party's computer) may then determine whether audio and video transfer has been terminated by either party [act 710]. If so, each computer involved in the audio and video transfer may end the transfer of the packets, containing the audio and video data, via packet-switched network 135 [act 715].

Conclusion

Systems and methods, consistent with the present invention, provide mechanisms that enable video conferencing using a circuit-switched telephone connection for audio, and a high-speed DSL connection for transmitting packetized video between parties to the conference. When a call is placed between a calling party number and a called party number in a circuit-switched network, a server references each of the party numbers to network addresses in a packet-switched network. The server sends these network addresses to respective nodes in the packet-switched network associated with each of the called and calling parties. The respective nodes may use the received network addresses to transfer packetized video, captured contemporaneously with audio transmitted via a circuit-switched network, between each of the parties to the circuit-switched telephone connection. With the packetized video transmitted at a high speed rate (e.g., a DSL rate), and the audio data transmitted at conventional circuit-switched rates, high quality video conferencing may be obtained. Furthermore, in other embodiments consistent with the invention, the respective nodes may use the received network addresses to transfer both packetized audio and video between each of the parties to the circuit-switched telephone connection.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Additionally, the present invention is applicable to establishing audio connections via cell phones or other mobile telephony devices. Also, while each computer (e.g., computers 102, 105 and 106) of FIG. 1 is shown as a separate device from each corresponding telephone (e.g., telephones 150, 152 and 156), the functions of both could be combined in a single device (e.g., a computer) such that the computer may send audio via a circuit-switched connection and video via a packet-switched connection.

While series of acts have been described with regard to FIGS. 5–7, the order of the acts may be altered in other implementations. Moreover, non-dependent acts may be performed in parallel. No element, step, or instruction used in the description of the present application should be construed as critical or essential to the invention unless explicitly described as such. The scope of the invention is defined by the following claims and their equivalents.

What is claimed is:

1. A method of setting up a video conference, comprising:
   receiving a calling party number and a called party number used for establishing a connection in a circuit-switched network;
   associating, via a lookup table, a first network address in a packet-switched network with the calling party number;
   associating, via the lookup table, a second network address in the packet-switched network with the called party number;
   sending a first message containing the second network address to the first network address via the packet-switched network; and
   sending a second message containing the first network address to the second network address via the packet-switched network, wherein each of the first and second network addresses comprises an Internet Protocol (IP) address.

2. The method of claim 1, further comprising:
   establishing a circuit-switched connection between the calling party number and the called party number.
3. The method of claim 2, further comprising:
   sending audio data via the circuit-switched connection.
4. The method of claim 1, further comprising:
   receiving the first message at a node associated with the first network address; and
   transmitting packetized video between the first network address and the second network address.
5. The method of claim 4, further comprising:
   receiving the second message at a node associated with the second network address; and
   transmitting packetized video between the second network address and the first network address.
6. The method of claim 5, further comprising:
   transmitting packetized audio between the second network address and the first network address.
7. The method of claim 5, further comprising:
   transmitting packetized audio between the first network address and the second network address.
8. The method of claim 1, wherein the first and second messages are sent via instant messaging.
9. A server, comprising:
   a memory configured to store instructions; and
   a processor configured to execute the instructions in the memory to:
   receive a calling party number and a called party number used for establishing a connection in a circuit-switched network,
   associate, via a lookup table, a first network address in a packet-switched network with the calling party number,
   associate, via the lookup table, a second network address in the packet-switched network with the called party number,
   send a first message containing the second network address to the first network address via the packet-switched network, and
   send a second message containing the first network address to the second network address via the packet-switched network, wherein the first and second network addresses each comprise Internet Protocol (IP) addresses.
10. The server of claim 9, wherein the first and second messages are sent via instant messaging.
11. The server of claim 9, wherein the packet-switched network comprises an Internet.
12. A computer-readable medium containing instructions for controlling at least one processor to perform a method of setting up a video conference, comprising:
   receiving a calling party number and a called party number used for establishing a connection in a circuit-switched network;
   associating, via a lookup table, a first network address in a packet-switched network with the calling party number;
   associating, via the lookup table, a second network address in the packet-switched network with the called party number;
   sending a first message containing the second network address to the first network address via the packet-switched network; and
   sending a second message containing the first network address to the second network address via the packet-switched network, wherein the first and second network addresses each comprise Internet Protocol (IP) addresses.

13. The computer-readable medium of claim 12, wherein the first and second messages are sent via instant messaging.

14. The computer-readable medium of claim 12, wherein the packet-switched network comprises an Internet.

15. A video conferencing system, comprising:
- a switch configured to establish a circuit-switched connection between a calling party number and a called party number;
- a server configured to associate, via a lookup table, first and second network addresses in a packet-switched network with each of the called party and calling party numbers;
- a telephony device configured to transmit audio data via the circuit-switched connection; and
- a node in the packet-switched network configured to transmit packetized video between the first and second network addresses responsive to establishment of the circuit-switched connection.

16. A system for setting up a video conference, comprising:
- means for receiving a calling party number and a called party number used for establishing a connection in a circuit-switched network;
- means for associating, via a lookup table, a first network address in a packet-switched network with the calling party number;
- means for associating, via the lookup table, a second network address in the packet-switched network with the called party number;
- means for sending a first message containing the second network address to the first network address via the packet-switched network; and
- means for sending a second message containing the first network address to the second network address via the packet-switched network, wherein each of the first and second network addresses comprises an Internet Protocol (IP) address.

* * * * *